United States Patent [19]

McGinniss

[11] 4,040,925

[45] Aug. 9, 1977

[54] ULTRAVIOLET CURING OF ELECTROCOATING COMPOSITIONS

[75] Inventor: Vincent D. McGinniss, Valley City, Ohio

[73] Assignee: SCM Corporation, New York, N.Y.

[21] Appl. No.: 466,127

[22] Filed: May 2, 1974

[51] Int. Cl.$^2$ ............................................. C25D 13/06
[52] U.S. Cl. .................................................. 204/181
[58] Field of Search ......................... 204/181; 427/54

[56] References Cited

U.S. PATENT DOCUMENTS

| | | | |
|---|---|---|---|
| 3,492,213 | 1/1970 | Johnson | 204/181 |
| 3,511,687 | 5/1970 | Keyl et al. | 204/159.19 |
| 3,554,886 | 1/1971 | Colomb et al. | 204/159.12 |
| 3,565,779 | 2/1971 | Luders et al. | 204/159.14 |
| 3,761,371 | 9/1973 | Dickie et al. | 204/181 |
| 3,926,639 | 12/1975 | Rosen et al. | 427/43 |
| 3,936,368 | 2/1976 | Watanabe et al. | 204/181 |

*Primary Examiner*—Howard S. Williams
*Attorney, Agent, or Firm*—Thomas M. Schmitz

[57] ABSTRACT

An electrocoating composition useful for electrocoating a paint from an aqueous solution onto an anode conductive substrate and curing the paint film with ultraviolet energy. The electrocoating composition containing an ultraviolet sensitizer uniformly electrodeposits on the substrate to provide a paint film containing a constant level of ultraviolet sensitizer relative to a reactive ethylenically unsaturated polymer.

3 Claims, No Drawings

ULTRAVIOLET CURING OF ELECTROCOATING COMPOSITIONS

BACKGROUND OF THE INVENTION

Electrocoating compositions are well known and disclosed in Gilchrist patents, such as U.S. Pat. Nos. 3,351,675; 3,362,899; 3,575,909, and 3,351,575, and the same are incorporated herein by reference. Prior art electrocoating compositions are often cured by the inclusion of catalysts and followed by application of heat. More recently, electron beam polymerization of electrocoating compositions has been suggested in U.S. Pat. Nos. 3,501,390 and 3,501,391, and the same are incorporated herein by reference.

It now has been found that an unsaturated, water-dispersible ethylenically unsaturated polymer containing ultraviolet sensitizer can be solubilized in aqueous solutions and uniformly electrocoated onto the substrate while maintaining a critical ratio of sensitizer to polymer electrocoated onto the substrate. This invention provides an expedient and efficient solution to inherent problems pertaining to electrocoating a polymer susceptible to ultraviolet radiation curing. Such polymers must be rendered water soluble as well as curable by ultraviolet energy. Electrocoating compositions of this invention containing ultraviolet sensitizers are stabilized in the electrocoating bath to properly maintain a constant ratio of sensitizer to polymer. Up to about 5% photosensitizer is required to activate the polymer with actinic radiation and this ratio of polymer relative to a low percentage of ultraviolet sensitizer must be maintained when the composition is electrocoated onto the substrate so that a complete cure is achieved when exposed to ultraviolet light.

Accordingly, a primary object of this invention is to provide an electrodepositable composition containing a stabilized ratio of ultraviolet sensitizer dispersed in an ethylenically unsaturated polymer solubilized in aqueous solution that can be efficiently and uniformly electrocoated on a substrate and subsequently cured with ultraviolet energy.

A further object is to provide a process for solubilizing an ethylenically unsaturated polymer containing an ultraviolet sensitizer within an aqueous solution, electrocoating a constant ratio of ultraviolet sensitizer and polymer onto an anode conductive substrate to provide a paint film on the substrate, and irradiating the paint film with ultraviolet energy until the film becomes fully cured.

These and other advantages of the invention will become more apparent by referring to the Detailed Description of the Invention.

SUMMARY OF THE INVENTION

A composition for electrodepositing a paint film onto an anode conductive substrate comprises an ethylenically unsaturated polymer containing ultraviolet sensitizer dispersed therein and solubilized in an aqueous solution. The composition can be uniformly electrocoated onto a substrate to form a paint film containing a constant ratio of minor amounts of ultraviolet sensitizer, and efficiently cured by exposing the paint film to ultraviolet energy.

DETAILED DESCRIPTION OF THE INVENTION

The electrocoating composition of this invention comprises a water dispersible ethylenically unsaturated polymer containing ultraviolet sensitizer. Ethylenically unsaturated polymers include vinyl polymers having pendent unsaturated vinyl groups selected from acrylyl, acrylamide, and allyl unsaturation and further include reactive ethylenic unsaturation in the polymer backbone. The reactive ethylenic unsaturation can be effectively cured by ultraviolet light energy through a free radical polymerization process wherein a free radical is induced by the sensitizer upon exposure to ultraviolet energy irradiation thereby causing polymerization of pendant vinyl unsaturation and/or ethylenic unsaturation contained in the polymer backbone. The reactive ethylenically unsaturated polymers further contain carboxyl groups which can be neutralized with water solubilizing amine derivative to disperse the polymer in water and render the polymer ionic whereby the polymer can be electrocoated onto an anode substrate.

The preferred ethylenically unsaturated polymers are acrylyl unsaturated polymers containing acrylic acid, methacrylic acid, or sorbic acid copolymerized with other polymeric groups to form an acrylic unsaturated polymer having pendent and/or terminal acrylic unsaturation. The acrylyl unsaturated polymers are linear or branch acrylyl polymers having a molecular weight in the range of 170 to 100,000 and even higher in acrylic emulsion polymer. The unsaturated acrylyl groups cross-link into a three-dimensional insoluble, infusible polymer upon being irradiated with ultraviolet actinic light. The acrylyl groups can be pendent as in a branch portion of acrylic polymers wherein acrylic acid is esterified with glycidyl acrylate or an epoxy novolac resin. Acrylyl terminated polymers can be ethylenically unsaturated diacrylyl terminated polymers such as disclosed in U.S. Pat. No. 3,759,808, but further modified to include carboxyl groups attached to the polymer backbone. Acrylyl polymers can be prepared from polyfunctional organic acids, polyfunctional epoxides, polyfunctional isocyanates, melamine resins, or dicarboxylic acid esters of polyepoxides, polyamines, polyisocyanates with 2-hydroxyalkyl acrylates or methacrylates. Representative classes of acrylyl terminated polymers include, for example, acrylyl terminated polyesters, urea acrylates, melamine acrylates, urethanes, acrylyl oils, acrylyl hydrocarbon resins, epoxies, and epoxyesters, amide-ester acrylyl terminated polymers, polyether acrylyl terminated polymers, hydrocarbon acrylyl terminated prepolymers, and generally polymers having two or more pendent or terminal acrylyl groups. Specific acrylic polymers can include, for example, trimethylolpropane triacrylate, pentaerythritol triacrylate, ethyleneglycol diacrylate, diacrylic acid adduct of the diglycidyl ether of bisphenol A (DER 332 diacrylate), a di- or tri-isocyanate reacted with a hydroxy containing acrylate such as hydroxyethyl or hydroxypropyl acrylate.

Other useful vinyl polymers include acrylamide and allyl unsaturation incorporated into the polymers to provide reactive pendent or terminal vinyl unsaturation in the polymer that can be activated by ultraviolet energy to cross-link into hard, infusible polymer. Allyl unsaturation can be achieved by reacting allyl alcohol with epichlorohydrin and thereafter reacted with a polyol or reactive hydroxyl containing prepolymer or reactive acid containing prepolymers to produce, for example, allyl glycidyl ethers or esters such as allyl glycidyl acrylate, allyl glycidyl methacrylate, and allyl glycidyl ether. Acrylamides can be produced, for example, by a trans-etherification reaction of a butyl or methyl ether of methylolacrylamide to produce a polymer having acrylamide vinyl unsaturation that reacts upon exposure to ultraviolet irradiation to produce an infusible polymer.

Ethylenically unsaturated alkyds and polyester are useful resins containing reactive ethylenic unsaturation in the polymer backbone. Both unsaturated alkyds and unsaturated polyesters are produced by esterifying polyols with dibasic acids wherein at least about 20% of the dibasic are reactive unsaturated dibasic acids such as maleic, fumaric, and itaconic acids or anhydrides. Unsaturated alkyd resins differ in that glycerol and pentaerythritol are ordinarily utilized instead of a glycol and such polyols are partially reacted with fatty acids.

The ethylenically unsaturated polymers useful in this invention further contain carboxyl groups attached to the polymer backbone for reaction with a solubilizing salt of an amine or a base such as KOH or NaOH to render the polymer water dispersible to provide an aqueous electrocoating solution. Carboxyl group functionality can be introduced into the polymer by reacting polycarboxylic acids such as maleic anhydride, acrylic acid, methacrylic acid, and like acids disclosed in U.S. Pat. No. 3,230,162. The ethylenically unsaturated polymer containing reactive carboxylic acid groups have an acid number between about 20 to 200 and preferably between about 40 to 80 as measured by ASTM 555-54. Such polymers can be produced by reacting a mono-, di-, or multi-functional epoxide resin with one or more moles of vinyl unsaturated acid to an acid number of zero. The resultant unreacted secondary hydroxyl on the copolymer can then be reacted with maleinized oil or maleinized fatty acid to give a water dispersible ultraviolet curable electrocoating resin having pendent vinyl unsaturated groups such as acrylyl, allyl, or acrylamide wherein the polymer contains carboxyl groups attached to the backbone of the polymer. Alternatively, a similarly reacted epoxide resin can be completely reacted with two or more moles of any unsaturated or conjugated unsaturated organic acid which can be maleinized, that is, further reacted with maleic anhydride. The resulting polymer is reacted with maleic anhydride to produce a maleinized oil epoxy resin which can then be reacted with a hydroxy containing acrylate such as 2-hydroxy ethyl acrylate or n-methylol acrylamide to produce an acrylated or unsaturated substituted carboxyl containing polymer. The resulting polymer is ultraviolet reactive. The reaction between maleic anhydride and fatty acids or derivatives thereof is known as maleinization and effectively introduces free carboxyl functionality into the polymer as set forth in "Electrodeposition of Coatings," *Advances in Chemistry Series* 119 (1973), pages 88-89, and incorporated herein by reference. Generally through additional or esterification, any mono-, di-, or multi-functional epoxide resin is reacted with conjugated or non-conjugated ethylenically unsaturated fatty acid or similar organic acid that can undergo a maleinization reaction with maleic anhydride, typically known as a Diels Alder reaction. Typical dibasic acids or anhydrides in addition to fatty acids and oil include: adipic, phthalic, isophthalic, terephthalic, tetrahydrophthalic, maleic, succinic, dodecenylsuccinic, azaleic, itaconic, and dimer acids. Hydroxyl containing unsaturated acrylates or acrylamides for reaction with the maleinized adduct include, for example: hydroxy ethyl acrylate, hydroxy ethyl methacrylate, hydroxy propyl acrylate, hydroxy propyl methacrylate, n-methylol acrylamide, the reaction produce of epi chlorohydrin and acrylic acid, the reaction product of Cardura E and acrylic acid, and hydroxy ethyl sorbate. Typical acrylyl, allyl, acrylamide, and other ethylenically unsaturated polymers having carboxyl functionality useful in this invention are further disclosed in the examples.

Photosensitizers are combined with the reactive ethylenic unsaturated polymers, and are adapted to be simultaneously co-deposited with the polymer onto the substrate during the electro-coating process. Photosensitizers are added to the polymers in amounts of at least 0.5% and preferably between about 1 to 5% by weight based on the polymer. The level of photosensitizer remains substantially constant both in the electrocoating bath solution and during the electrocoating process to provide a paint film on the substrate containing photosensitizer in the proper proportions to the polymer. Ultraviolet irradiation causes the sensitizer to break up into free radicals which activate the reactive double bond unsaturation of the pendent vinyl group or ethylenic unsaturation in the polymer backbone to effect cross-linking thereof until the irradiated paint film is fully cured. Useful ultraviolet photosensitizers include halogenated polynuclear ketones generally represented by the formula

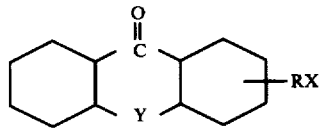

wherein Y is a carbon, a carbonyl

sulfur, oxygen, a halo-substituted carbon; RX is a halogen-containing radical selected from halosulfonyl, alpha-haloalkyl and alpha-haloalkylated aryls. The halogenated polynuclear ketones can be selected from chlorosulfonated benzanthones, chlorosulfonated fluorenone, alpha-haloalkylated benzanthrones, and alpha-haloalkylated fluorenone, as disclosed in Ser. No. 323,031 filed Jan. 12, 1973, and incorporated herein by reference. The benzanthrones can be selected from chloromethyl benzanthrone; sulfonyl chloride benzanthrone; 1,6-dichlorosulfonyl benzanthrone; isodibenzanthrone sulfonyl chloride; and dichlorosulfonyl-16,17-dibenzanthrone. The fluorenones can be selected from 2-bromomethyl-9-fluorenone sulfonyl chloride; chloromethyl-9-fluorenone-6,7-dichloro-alpha-bromofluorenone sulfonyl chloride; and 1-chloro-2-ethyl-9-fluorenone sulfonyl chloride.

Other suitable ultraviolet photoiniators include organic carbonyl compounds selected from alkylphenones, benzophenones, and tricylic fused ring compounds, as disclosed in U.S. Pat. No. 3,759,807 and incorporated herein by reference. Particularly desirable organic carbonyl photosensitizers can be selected from diethoxyacetophenone, alkyl ethers of benzoin, Michler's Ketone, benzophenone, xanthone, thio-xanthone, anthraquinone, and acetonaphthone. Other suitable ultraviolet sensitizers include carbonylated phenyl nuclear sulfonyl chlorides such as meta-benzophenone, monosulfonyl chloride, meta-acetophenone monosulfonyl chloride, and meta-benzaldehyde monosulfonyl chloride are particularly suitable for pigmented coatings are more particularly set forth in Ser. No. 323,032 filed Jan. 12, 1973, and incorporated herein by reference. Other suitable photosensitizer combinations particularly suitable for pigmented coatings are a combination of sensitizers comprising aromatic carbonyl compounds, aromatic aldehydes or aromatic ketones, and a synergistic sensitizer of about 0.05 to 3% of 2,2'-dithiobis-(benzothiazole) as more particularly set forth in Ser. No. 346,351 filed Mar. 30, 1973, and incorporated herein by reference. Similarly, a synergistic sensitizer of a halogenated derivative of naphthalene having a least one halogen attached to the alpha-atom attached to the naphthalene ring is particularly suitable sensitizer combination for pigmented coatings as more particularly set forth in Ser. No. 346,350 filed Mar. 30, 1973, and incorporated herein by reference.

At least about 0.5% by weight ultraviolet sensitizer and preferably 1 to 5% sensitizer is added to the polymer. The photosensitizers are thoroughly mixed or otherwise dispersed in the polymer prior to solubilizing the polymer in an aqueous solution.

The ethylenically unsaturated polymer having reactive carboxyl functionality and containing a suitable photosensitizer can be water solubilized by reacting the polymer with a solubilizing salt selected from an amine or a base. At least about 1% solubilizing salt is co-reacted with the ethylenically unsaturated polymer for neutralizing to neutralize carboxyl groups pendent and attached to the polymer backbone. Useful amine salts are selected from aliphatic, aromatic, and alkynolamines generally indicated as —NH$_2$, =NH, ≡N, —N—(ROH)$_2$, =N—(ROH), and N—(ROH)$_3$. Useful solubilizing bases are base salts such as NaOH and KOH. Neutralization of the ethylenically unsaturated polymer is based on the actual measurable acid value of the polymer. The acid number of the polymer should be at least about 20 and preferably between about 40 and 80. Among the amines that can be used from these neutralization salts are those amines which form water soluble salts with the polymers and have a carbon content of less than about 10 carbon atoms per amine molecule. Suitable amines include, for example, diethyl amine, triethyl amine, monoisopropanol amine, monoethanol amine, diethanol amine as well as ammonia and aqueous ammonia commonly called ammonium hydroxide, and other amines as set forth in the examples. Useful amines are disclosed in U.S. Pat. No. 3,759,807, and the same are incorporated herein by reference. The preferred amines are diethyl amine, triethylamine, methyldiethanol amine, diethylethanol amine, triethanolamine. Preferably just enough amine is added to form a water soluble salt of the polymer, and preferably between about 5 and 10% by weight amine is added based on the ethylenically unsaturated polymer. For example, polymers have an acid value of about 40 to 60 requiring about 0.7 to 1.0 equivalents of amine for each equivalent of acid found in the sensitized unsaturated polymer, although polymers having an acid value greater than 100 can require as little as 0.3 equivalent of amine per each equivalent of acid. The solubilized polymer can be stabilized with respect to undesirable amine build-up of ammonia or amines by the inclusion of about 0.1 to 1% of a dodecyl benzene sulfonic acid salt of alkenolamine, as disclosed in U.S. Pat. No. 3,699,066 and incorporated herein by reference.

Solubilization of the ethylenically unsaturated polymers containing ultraviolet sensitizer mixed therein can be effected by reacting the carboxyl groups on said polymer with a solubilizing salt derivative by adding the required amount of amine to the polymer, and then adding water to the amine salt of the polymer. The resulting mixture thereof can be agitated to form a stable water solution. A preferred method of solubilizing the polymers is to add slightly warmed polymer and photosensitizer mixture to a water amine solution and agitate and warm the solution, if necessary, until a compatible water solution is obtained. The solids content of such aqueous solution of solubilized polymer is generally about 5 to 25 weight percent, and preferably about 5 to 15 weight percent.

The water solutions of ethylenically unsaturated polymer containing ultraviolet sensitizer can be applied to a substrate in a conventional manner but is particularly suitable for electrocoating onto a conductive metal anode which is to the object to be coated with a paint film. The anode substrate is an electrically conductive metal such as iron, steel, aluminum, galvanized steel, zinc, and the like. The coating composition can be electrocoated onto the anode workpiece by passing a direct electric current between the anode and the cathode of the electrocoating bath to deposit a coating composition on the anode.

The method of electrocoating is carried out at a voltage above the threshold voltage of the electrocoating paint composition being electrocoated onto the anode workpiece. The threshold voltage is the voltage at which deposition of the solubilized acrylic binder composition containing ultraviolet photosensitizers is initiated upon the workpiece when a direct electric current passed through the electrocoating bath between the workpiece and a second electrode referred to as a cathode. The cathode is electrically negative in relation to the workpiece and spaced therefrom wherein both the cathode and the anode electric workpiece is in electrical contact with the electrocoating bath. The maximum tolerable voltage is slightly below the rupture voltage of the paint coating being applied to the substrate. The rupture voltage is commonly understood to be that voltage at which a paint film already applied to the substrate ruptures upon continued application of such voltage across the terminals during the immersion of the workpiece within the electrocoating bath. The minimum desirable voltage should range between about 20 and about 500 volts, and preferably between about 50 and 300 volts. The temperature of the electrocoating bath normally is between about 15° and about 50° C. Preferably the temperature for electrodeposition is between about 20° and about 35° C and maintenance of the bath temperature between this temperature range is preferred. Electrocoating bath agitation is desirable to maintain uniformity of composition as well as uniform temperatures at the anode surfaces.

The electrocoating bath can be replenished continuously or incrementally with a replenishing composition so as to maintain the electrocoating bath approximately at a pre-determined composition wherein the total replenishment is substantially equal over a sustained operating period. The replenished composition can be concentrated having a higher level of solids to water content as set forth in U.S. Pat. No. 3,575,909, and the same is incorporated herein by reference.

After electrocoating the acrylic polymer composition onto the anode workpiece, subjecting the electrocoating composition can then be cured with ultraviolet irradiation to form a hard, fully cured paint film. Typical sources of ultraviolet energy ordinarily produce wavelengths in the ultraviolet spectrum that are transmitted through a quartz and such wavelengths are usually between about 1600 and 4000 A. Suitable ultraviolet emitters include various electric arc lamps, plasma arc torch, such as described in U.S. Pat. No. 3,364,387, and lasers having a lasing output in the ultraviolet spectrum as disclosed in U.S. Ser. No. 189,254, and the disclosures of said references are included herein by reference. Other suitable sources of actinic light include quartz mercury lamps, ultraviolet quartz lamps, and high flash lamps.

A preferred aspect of this invention is that the ultraviolet sensitizer can be further incorporated into the acrylic polymer backbone or otherwise tied into the polymer of the ultraviolet curable electrocoating resin system. The photosensitizer is contained within polymer backbone by including at least about 2% by weight, and preferably between about 3 to 20% by weight photosensitizer incorporated into the polymer backbone. The photosensitizer can be synthesized into the polymer, for example, by reacting the photosensitizer with the polymer prior to solubilizing the polymer in water. Photosensitizers found useful in this invention are carboxylated phenyl nuclear ketones generally represented by the formula of

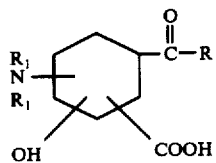

wherein R is an alkyl radical having 1 to 6 carbon atoms; and $R_1$ is selected from H and alkyl radicals having 1 to 6 carbon atoms. Carboxylated phenyl ketones, for example, include benzaldehyde derivatives such as

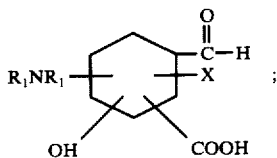

acetophenone derivatives such as

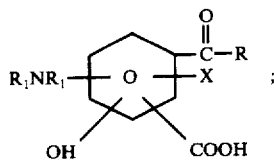

benzophenone derivatives such as

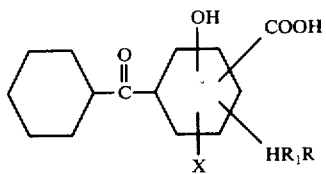

or

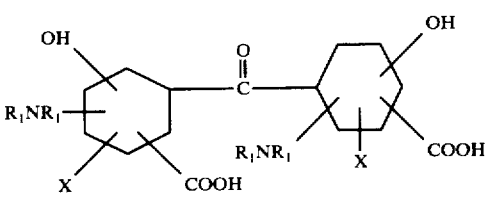

wherein X can be selected from chlorine, bromine, $NO_2$, N<, and OR. Particularly useful sensitizers include, for example, ortho-, meta-, and para-hydroxyacetophenone; 3-hydroxy-para-aminobenzaldehyde; 2-hydroxy-5-methoxybenzoaldehyde; 2-(para-hydroxybenzoyl)-benzoic acid; ortho- and para-hydroxy-benzophenone; 2-hydroxy-4-methoxy-benzophenone; and 3,3′,4,4′-benzophenone tetracarboxylicdianhydride. Other suitable photosensitizers include: 2-benzoylbenzoic acid; 4′-methylbenzophenone 2-carboxylic acid; 4-ethylbenzophenone 2-carboxylic acid; 4′-chlorobenzophenone 2-carboxylic acid; 3′-chloro-4′-methyl-benzophenone-2-carboxylic acid; 3′-nitro-4′-chloro-benzophenone-2-carboxylic acid; 2, 3, and 4 hydroxy acetophenone; 5-chloro-2-hydroxy benzophenone; 2-(4-hydroxy-benzoyl)-benzoic acid; 2 and 4-hydroxy-benzophenone; 2-hydroxy-4-methoxy-benzophenone; 3-hydroxy-para-anisaldehyde; 2-hydroxy-5-methoxy benzaldehyde; 3-chloro-4-hydroxy 5 methoxybenzaldehyde; 4′-chloro-2-hydroxy-4-methoxybenzophenone; 5-chloro-2-hydroxy-4-methylbenzophenone; 2-N-methylamino benzophenone; 4-N-methylaminobenzophenone; 2-N-methylamino-acetophenone; 3-N-methylaminoacetophenone; 4-N-methylaminoacetophenone; and 2-mercaptobenzophenone, and others as identified in the examples.

Another aspect of this invention is that the electrocoated film onto the anode substrate can be subjected to heat from gas-fired ovens or infrared heat to promote flowout of the electrocoating composition onto the substrate. Infrared heat applied to the paint film on the substrate, however, does not cure the paint film and does not effect curing of the paint film by subsequent exposure to ultraviolet radiation. Subjecting the paint film to heat prior to ultraviolet curing provides flowout and levelling of the paint film and is desirable, although such pre-heating is not a critical aspect of the invention.

The electrocoating composition can contain opacifying pigments and inert extenders such as, for example, titanium dioxide, zinc oxide, leaded zinc oxide, white lead, titanium calcium, clays such as kaolinite clays, silica, talc, mica, wollastonite, calcium carbonate, barium sulfate, ferrite yellow oxide, ferric oxide, "brown" iron oxide, tan oxides of iron, ultramarine blue, raw sienna, burnt sienna, raw and burnt amber, chromium oxide green, graphite, carbon black, zinc chromate, lampblack, calcium phosphate, calcium lead chromate, calcium phytate, chrome orange, cadmium reds and yellows, alumina, and elemental metal powders such as zinc, alumina, magnesium and copper. It is advantageous that water soluble salts in the pigments, such as sodium or potassium salts, are very low and preferably absent so that the electrical resistance of the bath and the film deposition is not subject to uncontrolled variation, and that the primary control of the electrical conductance is by means of the binder resin and amino compound dispersed in the bath. The component pigments can also be organic such as the green iron salt of nitroso beta naphthol, copper phthalonitrile blue, toluidine red, parachlor red, para toner (red), alkali resistant red, BON red and maroon, Wachtung red, madder lake red, Duratone red, carmine red, and Hansa yellows.

The invention is illustrated by the following examples but not intended to be limited thereto.

EXAMPLE 1

One mole of a liquid epoxy resin (DOW DER 332 being the diglycidyl ether of bisphenol A having an epoxide equivalent weight of 172 to 176) was reacted with two moles of acrylic acid until a final acid number of zero was obtained. This diacrylated epoxy resin was then reacted through the secondary hydroxyl groups (formed from or produced from the opening of the oxirane ring by acrylic acid) with a maleinized linseed fatty acid to give an oil modified, water dispersible di-acrylated epoxy resin suitable for electrocoating and subsequent curing with ultraviolet irradiation. The acid number of this resin was about 65 to effect water solubilization. The resin was then mixed with about 3% isobutyl ether of benzoin photoinitiator and then neutralized with about 5% of methyldiethanol amine and dissolved in deionized water to give about 15% resin solution. The neutralized resin was electrocoated onto steel panels under anodic electrocoating conditions using an impressed D-C voltage of about 100 volts. Electrocoated films were applied to provide 0.3 mil which were washed and then heated to about 180° F with a conventional heat source to effect flowout of the film. Heating at low temperatures or high temperatures for short periods of time increases flowout of the film but does not effect ultraviolet cure or cross-linking of the film. The flowed out film was then subjected to the ultraviolet irradiation from an 800 watt GE mercury, medium pressure lamp for five minutes. A completely cured paint film resulted which was tested with MEK with no softening resulting. Another steel panel was electrocoated with a film in the same manner but this paint film was cured under an 8,000 watt Ashdee 2 mercury lamp ultraviolet source for 10 seconds exposure time. The result was again a completely cured, hard film. MEK did not soften the film.

EXAMPLE 2

Similar results were achieved by the procedure in Example 1 by utilizing a different epoxy resin as starting materials having epoxide equivalent weights of: (a) 182 to 192 and (b) 230 to 250; wherein (a) or (b) was reacted with acrylic acid or methacrylic acid or sorbic acid to form an unsaturated acrylic polymer having an acid number of zero. The polymers were then reacted with maleinized oils such as maleinized dehydrated castor oil, maleinized tall fatty acid, and solubilized as set forth in Example 1. The acid numbers of the resin ranged from 40 to 100 and between about 2 to 5% photosensitizers were mixed into the polymer prior to solubilizing the same in water. Photo-initiators were benzoin, Michler's Ketone, or the isobutyl ether of benzoin. Electrocoated paint films were subject to ultraviolet irradiation and hard, cured films resulted.

EXAMPLE 3

One mole of a liquid epoxy resin (DOW DER 732 aliphatic diepoxides or glycidyl ethers of polyethylene and polypropylene oxides having an epoxide equivalent weight of 305 to 335) was reacted with two moles of acrylic acid until a final acid number of about zero was obtained. This diacrylated epoxy resin was then reacted through the secondary hydroxyl groups (formed from or produced from the opening of the oxirane ring by acrylic acid) with a maleinized linseed fatty acid to give an oil modified, water dispersible diacrylated epoxy resin suitable for electrocoating and subsequent curing through ultraviolet irradiation. The acid number of this final resin adduct was about 70. These reactions were carried out in an electrocoating co-solvent such as butyl cellosolve. This resin was mixed with about 5% combination of 5 parts p-dimethylamino benzophenone to 1 part benzophenone photoinitiator, neutralized with about 7% triethanol amine, and then let down into water. The aqueous electrocoating composition was electrocoated onto steel panels and cured through irradiation with ultraviolet light sources as in Example 1. The result was a fully cured MEK resistant hard film.

EXAMPLE 4

Example 1 was repeated but the liquid epoxy was replaced with an epoxy novolac resin formed from the epoxylation of a phenolic resin and having an epoxide equivalent weight of 172 to 179. The same results were obtained as in Example 1 when cured by ultraviolet irradiation. Similar epoxy novolac resins having an epoxy equivalent of 176 to 181 and 191 to 210, respectively, likewise produced excellent electrocoating compositions that cured upon exposure to ultraviolet light.

EXAMPLE 5

One mole of an epoxy resin being a diglycidyl ether of bisphenol A having an epoxide equivalent weight of 172 to 176 (DER 332) was reacted with four moles of linseed fatty acid. This adduct was then maleinized with four moles of maleic anhydride to produce an anhydride-oil modified epoxy resin. This resin was then reacted with four moles of 2-hydroxy ethyl acrylate to produce a water dispersible acrylated ultraviolet-curable resin electrocoating composition. This resin was mixed with 5% butylether of benzoin photoinitiator, neutralized with 7% diethylethanol amine, solubilized in water to provide at least a 15% solution, electrocoated a 0.3 mil paint film onto steel panels using 100 volts, and cured through ultraviolet irradiation by exposure to ultraviolet sources in a manner similar to Example 1.

EXAMPLE 6

Example 5 was repeated except the four moles of linseed fatty acid were replaced with four moles of dehydrated castor oil fatty acid (dehydrated Ricinoleic acid). Similarly, four moles of tall oil fatty acid were reacted with the epoxy resin. Both compositions produced excellent electrocoating resins which cured when exposed to ultraviolet sources.

EXAMPLE 7

One mole of epoxy resin being a solid epoxy resin based on the reaction product of epichlorohydrin and bisphenol A and having an epoxide value of 475 to 575 (DER 661) was reacted with six moles of tall oil fatty acid. This adduct was then maleinized with three moles of maleic anhydride to produce an anhydride-oil modified epoxy resin. This resin was then reacted with three moles of 2-hydroxy ethyl acrylate or N-methylalacrylamide to produce an acrylated or acrylamide ultraviolet-curable resin electrocoating system. In the manner set forth in Example 1, the resin was mixed with 5% photoinitiator, neutralized with 10% amine, solubilized in water, electrocoated onto steel panels, and cured through ultraviolet irradiation by ultraviolet sources indicated in Example 1.

EXAMPLE 8

One mole of pentaerythritoltriacrylate was reacted with (a) one mole of a maleinized oil, (b) one mole of any succinic anhydride, (c) one mole of trimalletic anhydride, or (d) one mole of maleic anhydride to produce an ultraviolet-curable electrocoating resin. Each such resin was neutralized with 10% triethanol amine, 8% benzophenone photoinitiator was added, solubilized in water to provide a 15% solution, electrocoated with steel panels, and ultraviolet cured through ultraviolet irradiation as described in Example 1. Excellent paint films were obtained.

EXAMPLE 9

An acrylic resin containing acid functionality was reacted with glycidyl acrylate to produce an acrylated carboxy substituted water soluble ultraviolet-curable electrocoating resin having an acid number of 40. An acrylic resin containing pendent glycidyl groups on its backbone (copolymerization of glycidyl methacrylate or acrylate with other unsaturated monomer or acrylic ester) was further reacted with acrylic acid to produce a hydroxy containing acrylic unsaturated resin adduct. The adduct was then further reacted with a maleinized oil or anhydride to produce a water dispersible ultraviolet-curable electrocoating system. The electrocoating composition was electrocoated onto a panel and cured to a hard paint film upon exposure to ultraviolet energy as indicated in Example 1.

EXAMPLE 10

Two moles of toluenediisocyanate was reacted with (a) ethylene glycol (b) propylene glycol, (c) polyethylene, or (d) polypropylene glycol to give an isocyanate terminated urethane resin. Each isocyanate (difunctional) resin was then reacted with two moles of dimethylol-propionic acid to produce a hydroxycarboxy terminated urethane resin. Each resin was then further reacted with two moles of an adduct of hydroxyethyl acrylate and toluene diisocyanate to produce an acrylic unsaturated carboxy functional urethane resin. About 5% thioxanthone photoinitiator was added to each resin which was then solubilized in water with 8% 2-hydroxy ethyldiisopropylamine to produce a 10% solution. Each resin was electrocoated onto a steel panel and cured with ultraviolet light as described in Example 1.

EXAMPLE 11

One mole of secondary amine (a) morpholine, (b) methyldiethanol amine, or (c) diethanol amine was reacted with di-, tri-, or multi-functional acrylate (ethyleneglycoldimethacrylate or diacrylate neopentylglycoldiacrylate, trimethylolpropane triacrylate, epoxy oil acrylates, etc.) to produce an amine substituted unsaturated resin to be used or a co-neutralizing or solubilizing agent in ultraviolet-curable anodic electrocoating.

EXAMPLE 12

A photosensitizer was incorporated into the polymer backbone by reacting one mole of epoxy resin with two moles of acrylic acid followed by further reaction with (a) one mole of benzophenone tetracarboxylic dianhydride, or (b) 2 moles of the monoethyl ester benzophenone tetracarboxylic dianhydride. Each resin was further reacted with 10% triisopropanol amine and solubilized in water to produce a 10% bath solution of electrocoatable resin. Steel panels were electrocoated and then cured with ultraviolet light energy to produce hard tack-free paint films.

EXAMPLE 13

An amine containing photosensitizer can be produced for both solubilizing the polymer and incorporating a photosensitizer into the polymer backbone by reacting (a) one mole of benzoylbenzoic acid or (b) one mole of p-hydroxy benzophenone with one mole of ethylene amine to produce an amine containing photosensitizer. Each of the foregoing resins were used to neutralize 2 moles of epoxy diacrylate resins (DER 332) co-reacted with 2 moles of a maleinized oil.

EXAMPLE 14

A silicon-modified polyester resin was prepared by reacting one mole of maleic anhydride with ten moles of trimethylolpropane, 60 grams of xylene, and 215 grams of a methoxycapped linear phenyl- and methyl-substituted siloxane of average molecular weight 450. The mixture was placed in a one-liter resin kettle equipped with motor driven blade stirrer, 6-inch distillation column, dropping funnel and thermocouple and stirred under reflux, removing a total of 25 ml of methanol and then 20 ml of water over a period of 12 hours. During that time the kettle temperature was raised to a maximum 190° C. [The siloxane polymer was the reaction product of equimolar amounts of dimethyldichlorosilane, diphenyltrichlorosilane and water, capped with methanol.] After the reaction and removal of the water, two moles of trimellitic anhydride was added followed by reaction with two moles of glycidyl acrylate. This polymer system was added together with 5% 2-chlorothioxanthone, 10% methyldiethanol amine, and water to make a 7% solution. This solution was electrocoated onto steel panels at 75 volts for 1 second at 75° F, cured for 10 seconds under a 2 lamp Ashdee UV curing unit, and resulted in a fully cured film.

EXAMPLE 15

Ethylenically unsaturated polymers were synthesized in cellosolve solvents such as butyl cellosolve or hexyl cellosolve in the manner indicated in Example 1. The polymers were synthesized from the following monomers:

(a)  1.5 moles methyl methacrylate  
    4.0 moles butyl acrylate   } prepolymer  
    1.0 moles acrylic acid  
Solubilized with 5% triethanol amine.  
Mixed with 30% crosslinking unsaturated pentaerithitol triacrylate polymer.  
Added 3% of sensitizer mixture of Michler's ketone, benzophenone, and 2,2'-dithiobis-benzothiazole (1:6:3).

b. The prepolymer of (a) was further reacted with 0.5 moles of glycidyl acrylate.
Polymer was solubilized with 5% triethanol amine.
Mixed with 30% unsaturated pentaerithitol triacrylate.
Added 3% of sensitizer mixture of (a).

c.
3.5 moles styrene
2.0 moles ethyl acrylate
2.0 moles butyl acrylate
1.0 moles 2-ethylhexyl acrylate
1.5 moles methacrylic acid
Solubilized with 3% dimethylethanol amine.
Mixed with 30% epoxydiacrylate.
Sensitized with 3% butyl ether of benzoin.

d.
1.0 moles styrene
1.0 moles ethyl acrylate
1.0 moles methyl methacrylate
2.0 moles acrylic acid
Solubilized with 10% triethyl amine.
Mixed with 30% trimethylolpropane triacrylate.
Sensitized with 3% diethoxyacetophenone.

e.
2.0 moles styrene
2.0 moles methacrylic acid
1.0 moles ethyl methacrylate
1.0 moles butyl methacrylate
Solubilized with 6% diethylethanol amine.
Mixed with 30% pentaerythitoltriacrylate.
Sensitized with 3% benzophenone.

f.
1.5 moles styrene
2.0 moles butyl acrylate
1.5 moles acrylic acid
1.0 moles isobutyl methacrylate
0.5 moles lauryl methacrylate
0.5 moles stearyl methacrylate
Solubilized with 5% methyl ethanol amine.
Mixed with 30% melamine acrylate.
Sensitized with 3% mixture of xanthone and benzoin.

g.
2.0 moles methyl methacrylate
1.5 moles acrylic acid
1.0 moles hydroxypropyl methacrylate
0.5 moles methylacrylamide
0.5 moles methacrylate
Solubilized with 3% KOH.
Mixed with 30% epoxydized soybean oil acrylate.
Sensitized with 3% mixture of Michler's Ketone/benzophenone.

h.
1.0 moles styrene
1.5 moles methyl methacrylate
3.0 moles butyl acrylate
2.0 moles methacrylic acid
2.0 moles hydroxy ethyl methacrylate
Solubilized with 5% triisopropanol amine.
Mixed with 30% ethyleneglycol diacrylate.
Sensitized with 3% mixture of Michler's Ketone/benzophenone/2,2' dithiobis benzothiazole.

i.
1.5 moles methyl methacrylate
2.0 moles butyl acrylate
1.5 moles acrylic acid
0.5 moles butyl methacrylate
1.0 moles hydroxy propyl methacrylate
0.5 moles methacrylate
Solubilized with 4% triethanol amine.
Mixed with 30% ethylene glycol dimethacrylate.
Sensitized with 3% benzophenone tetracarboxylic dianhydride.

j.
0.5 moles styrene
1.5 moles methyl methacrylate
2.0 moles 2-ethylhexyl acrylate
1.5 moles methacrylic acid
1.5 moles hydroxy propyl methacrylate
1.0 moles methylacrylate
Solubilized with 8% diethyl ethanolamine.
Mixed with 30% hydroxyethyl acrylate toluene diisocyanate di adduct.
Sensitized with 3% benzoin.

k.
3.5 moles styrene
4.0 moles butyl acrylate
1.5 moles methacrylic acid
1.0 moles hydroxy propyl methacrylate
Solubilized with 10% N-ethylmorpholine.
Blended with 30% butylene glycol dimethacrylate.
Sensitized with 3% thioxanthone.

l. The prepolymer in (c) was further reacted with 0.5 moles of glycidyl methacrylate and thereafter solubilized and sensitized in the manner set forth in (c).

m. The prepolymer in (d) was reacted with 1.0 moles of allyl glycidyl ether and thereafter solubilized and sensitized in the manner set forth in (d).

n. The prepolymer in (e) was reacted with 0.7 moles of glycidyl acrylate and thereafter solubilized and sensitized in the manner set forth in (e).

o. The prepolymer in (f) was further reacted with 0.5 moles of glycidyl acrylate and thereafter solubilized and sensitized in the manner set forth in (f).

p. The prepolymer in (g) was reacted with 0.5 moles of the mono adduct of hydroxyethylacrylate with toluenediisocyanate and thereafter solubilized and sensitized in the manner set forth in (g).

q. The prepolymer in (h) was further reacted with 1.0 moles of the mono adduct of hydroxypropylmethacrylate with isophoronediisocyanate and thereafter solubilized and sensitized in the manner set forth in (h).

r. The prepolymers of (i), (j), and (k), respectively, were each reacted with 0.5 moles of the mono adduct of hydroxyethylacrylate with toluenediisocyanate and thereafter each resin was solubilized and sensitized as set forth in (i), (j), and (k), respectively.

Each of the foregoing solubilized and sensitized polymers were electrocoated onto a test panel and were exposed to a 8000 watt Ashdee 2 mercury lamp ultraviolet source for ten seconds. Each film was a hard and completely cured film and resistant to an MEK solvent. Film thickness ranged from 0.1 mil to 1 mil thickness.

EXAMPLE 16

A polymer was compounded similar to Example 1 comprising by weight 56% epoxy resin (DER 331), 8% adipic acid, 10% acrylic acid, 5% benzophenone carboxylic acid, 21% maleinized tall oil fatty acid. The polymer was neutralized with 10% triethanolamine and solubilized in a water solution. A paint film was electrocoated onto a steel panel and then exposed for one second to a $CO_2$ infrared laser source (75 milliamperes, output 10 watts) located about 10 feet from the test panel to achieve flowout of the polymer on the metal surface. The wet film was then cured with ultraviolet energy in the manner indicated in Example 1 and a hard, fully cured film resulted.

EXAMPLE 17

An ultraviolet curable electrocoating resin system (A) containing 5% of 4,4'-benzophenonedicarboxylic acid photosensitizer dispersed in the polymer phase was compared with a similar resin wherein (B) the photosensitizer was reacted with the polymer to incorporate the sensitizer into the polymer backbone. Both electrocoating systems were based on polymers comprising one equivalent of terephthalic acid, two equivalents epoxy resin (DER 332 Example 1), and two equivalents acrylic acid and reacted to an acid number of essentially zero. Thereafter two equivalents of succinic acid were reacted with free hydroxy groups from ring opening an epoxide followed by neutralization with 8% triethanol amine and solubilized in water to provide a 7% aqueous electrocoating solution. The polymer contains photosensitizer in the backbone differed only in that 10% equivalents of terephthalic acid were replaced with the 4,4'-benzophenonedicarboxylic acid in the initial stages of polymer synthesis.

Both polymers A and B were electrocoated onto a steel panel and exposed to ultraviolet energy for 10 seconds. The respective paint films were comparatively tested as follows:

TABLE 1

| Test | Resin (A) Sensitizer Mixed In Polymer | Resin (B) Sensitizer In Polymer Backbone |
|---|---|---|
| MEK resistance | 50 MEK rubs | 100 MEK rubs |
| Pencil hardness | H - 2H | 6B - F |
| Stability of electrocoating solution | 5 hours | 500 hours |

I claim:

1. In a process for electrocoating a paint film onto an anode substrate dispersed within an aqueous electrocoating bath, the electrocoating composition being dispersed in water and comprising an ethylenically unsaturated polymer containing ethylenically unsaturated groups selected from acrylyl, acrylamide, and allyl, said ethylenically unsaturated polymer having a carboxylic group functionality and an acid number of at least about 20, said ethylenically unsaturated polymer being solubilized in water by reacting said polymer with at least about 1% by weight of a solubilizing derivative selected from aliphatic amines, aromatic amines, alkynolamines, sodium hydroxide and potassium hydroxide, and electrocoating said polymer onto the anode substrate to form a film thereon, the improvement comprising:

reacting at least about 2% by weight of an ultraviolet sensitizer with said polymer to attach the ultraviolet sensitizer to the polymer structure, said ultraviolet sensitizer being reacted onto the polymer structure prior to the step of neutralizing the polymer and prior to dispersing the polymer into the electrocoating water bath;

electrocoating said polymer containing the ultraviolet sensitizer connected to the polymer structure onto the anode substrate wherein the ultraviolet sensitizer remains tied to the polymer structure while electrocoating a polymeric film onto the anode substrate; and exposing said polymeric film to ultraviolet energy to activate the ultraviolet sensitizer connected to the polymer structure and cross-link the ethylenic unsaturation in the polymer structure to provide a cured paint film on the anode substrate.

2. The process in claim 1 wherein the ultraviolet sensitizer in a carboxylated phenyl nuclear ketone combined with said polymer backbone by reacting between about 3 and 20% by weight of said ultraviolet sensitizer with the said polymer.

3. The process in claim 2 wherein the ultraviolet sensitizer is selected from benzaldehyde derivatives, acetophenone derivatives, and benzophenone derivatives.

* * * * *